Feb. 4, 1936.  L. DILLON  2,029,362
ELECTRIC DEHYDRATOR
Filed Oct. 23, 1933
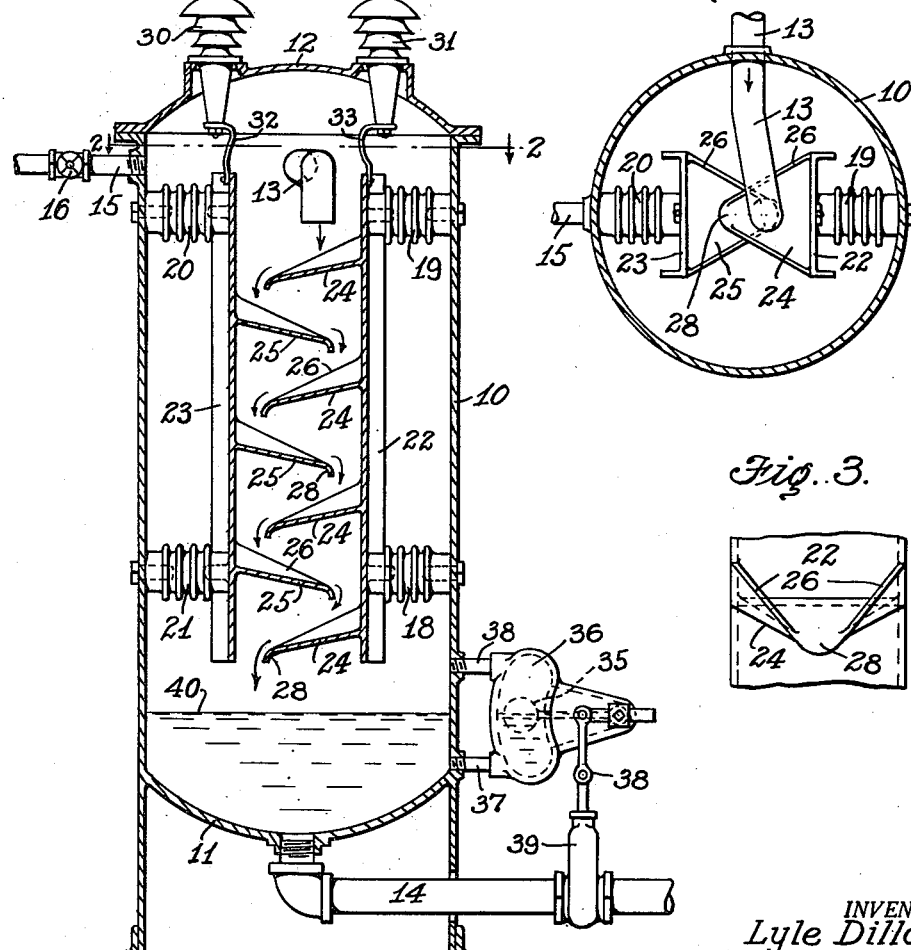
INVENTOR.
Lyle Dillon
BY Philip Subkow
ATTORNEY.

Patented Feb. 4, 1936

2,029,362

UNITED STATES PATENT OFFICE 2,029,362

ELECTRIC DEHYDRATOR

Lyle Dillon, Los Angeles, Calif., assignor to Union Oil Company of California, Los Angeles, Calif., a corporation of California Application October 23, 1933, Serial No. 694,837

3 Claims. (Cl. 204—24)

This invention relates to the separation of the constituents of an emulsion, and particularly to the electrical dehydration of petroleum emulsions.

Crude petroleum from the well in many cases is associated in part with water in a finely-divided and thoroughly mixed state known as emulsification. The oil usually comprises the continuous phase and the water the dispersed phase, and the water thus entrapped in the oil as produced from the well, will not settle or separate from the oil by gravity in any length of time but remains in permanent suspension.

It has been the practice to treat this emulsion electrically by subjecting it to an electric field of high voltage gradient. Such electrical treatment causes an agglomeration of the finely-divided water particles in the emulsion until water particles of large enough size and great enough weight are formed to allow settling and separation by gravity.

In most cases where the agglomeration of the emulsified water particles is thus brought about and where the electric field is maintained by conventional continuous high voltage alternating or direct current, short-circuiting of the electric field by aligned water particles or chains of water particles occurs almost immediately, and this short-circuited condition persists indefinitely resulting in a reduction of the strength of the electric field to such an extent that the treatment is impaired or rendered entirely ineffective. Also, in the conventional type of treater the electrodes between which the electric treating field is maintained are entirely surrounded by the conductive emulsion undergoing treatment. The emulsion in this type of treater in most cases moves relatively slowly even in the high velocity types and unless special means are provided for agitating the emulsion undergoing treatment, a detrimental amount of short-circuiting and consequent loss of treating will result.

To obviate the loss in effective treating potential caused by short-circuiting water chains or bodies, recirculation of dry dielectric oil, or movement of electrodes, or other agitating or insulating means have heretofore been employed resulting in inefficiency of treatment, reduction of capacity, non-uniformity of operation and regulation and dependence upon mechanically operated moving parts. Moreover, in many cases with all these devices in the conventional treater, it has been impossible to obtain satisfactory deemulsification of oils without the simultaneous aid of chemicals.

Objects of this invention therefore are, to overcome the above enumerated disadvantages of the common dehydration methods and apparatus and to provide a novel form of treater and method of treatment which will be efficient, economical, and of high capacity, simple and uniform in operation, and capable of effectively treating emulsions which are extremely short-circuiting in character. It is an object of this invention to provide a method and apparatus capable of effectively treating a wide range of types of emulsions. It is another object to provide a process and apparatus which will effectively dehydrate emulsions having extremely short-circuiting tendencies, and/or of very high water content and correspondingly extremely low electrical resistances. It is an object to provide an apparatus in which the treating field is concentrated and practically limited to the stream of emulsion undergoing treatment. It is an object to provide a treater apparatus in which agitation and other conditions necessary to prevent detrimental short-circuiting are inherent and which are independent of the quantity of fluid flowing through the treater.

Some of the more important features of the invention are included in the following:

The treater utilizes an intense electrical condenser discharge through the emulsion to be treated. The treater utilizes electrodes and an electrical system which is entirely insulated from the treater shell. The treater utilizes two electrode systems, each system comprising a plurality of sloping plate electrodes interspaced with respect to the electrodes of the other system in a vertical line, one above the other, the plates of the two systems being oppositely charged. The emulsion undergoing treatment drops from plate to plate, treatment taking place in the falling emulsion streams which bridge the gaps between oppositely charged plates. The velocity of the falling emulsion stream undergoing treatment is largely independent of the quantity of flow and is governed by the plate spacing, so that short-circuits which may tend to occur therethrough are scarcely allowed to form and do not remain in the field for any appreciable time. Insulation of the electrodes and treating zone by a surrounding atmosphere of gas favors economy of current consumption by obviating any possibility of stray currents through an emulsion body which has already undergone treatment.

This invention is embodied in apparatus comprising a treating zone inside of a gas-tight metallic enclosure, said treating zone comprising the space between two electrode systems, each of which consists of a plurality of vertically spaced sloping plate electrodes. The plates of each electrode system are vertically interspaced with relation to one another and oppositely electrically charged. The emulsion to be treated enters the top of the treater above the electrode plates and falls through the treater from plate to plate until it reaches the bottom where it accumulates in small quantity and is withdrawn. The treatment of the emulsion takes place in the falling streams thereof between the plates of opposite electrical potential. The gas-tight metallic enclosure is adapted to withstand high pressures to prevent formation of excessive quantities of vapors from heated emulsions undergoing treatment.

Broadly stated the invention resides in a process and apparatus for treating emulsions wherein two spaced electrodes are provided within a gas-tight shell, both the electrodes and the treating zone being electrically insulated from the treater shell and from each other, and wherein means is provided to confine the emulsion being treated to streams between the electrodes out of contact with other parts of the treater structure. The invention also resides in apparatus and means for maintaining an insulating gas space outside of that portion of the treater electrode structure to which the treating is confined. The invention also resides in apparatus and means for treating emulsion in a stream falling from one electrode to another, in such a manner that the said stream is thus electrically isolated and rendered inherently non-short-circuiting in effect. This invention also includes in combination the uilization of an interrupted potential or an intermittent condenser discharge through the emulsion.

Other objects and advantages of the invention will be evident hereinafter:

In the accompanying drawing wherein one embodiment of the invention is illustrated, Figure 1 is a vertical sectional elevation of the treater assembly, Figure 2 is a plan cross section through the treater taken on line 2—2, Figure 3 is an enlarged front elevation of an electrode plate.

The treater illustrated, comprises a gas-tight cylinder 10 with spherical bottom 11 and spherical head 12. An emulsion inlet pipe 13 is situated near the top of the cylindrical section 10, and an emulsion outlet connection 14 is situated in the center of the spherical bottom. A gas inlet and outlet connection 15 is also provided near the top of the cylindrical section 10.

Two electrode systems are horizontally spaced and vertically supported inside of the treater shell 10 on either side of the axis thereof by means of supporting insulators 18, 19, 20, and 21. The electrode systems each comprise channel irons 22 and 23, supported vertically back to back as just described by means of the supporting insulators 18, 19, 20, and 21. On the two adjacent backs of the said channels 22 and 23 are attached a number of sloping plate electrodes 24 and 25. As illustrated in the drawing, these plate electrodes attached to opposite channel supports are interspaced vertically equidistant from one another. Each plate electrode is approximately triangular in shape as seen from above, and has upwardly extending sides 26 which are at a maximum height at the point where they join the channel backs and taper off to a point at the lower apex of the said triangular plate. These sides serve to support the said plates and lend rigidity thereto as well as to confine and guide the flow of liquid downward thereover towards the lower apex thereof. The said lower apex of the triangular shaped plate is provided with a lip curved downward slightly as shown at 28 in order to present a surface more favorable to smooth flow of liquid therefrom. Apparently, the smooth flow of liquid is partly due to the establishment of a discharge from the edge of the lip of the electrode. While seven electrode plates are shown in the drawing, any number of plates may be employed in each electrode system to obtain the required treatment.

Electrical connections are provided from the outside of the treater to the electrodes through lead-in insulator bushings 30, 31, flexible connections 32 and 33, and channels 23 and 24.

A liquid level float 35 in float control 36 is provided connected to the treater shell 10 at 37 and 38. The float operates on the outlet valve 39 through rod 38 to control the level of accumulated liquid in the bottom of the treater.

The high voltage supply for the treater electrodes comprises a high tension transformer 45, a high tension condenser 46, an intermittent spark gap or interrupter 47 and the requisite electrical connections 49, 50, 51, 52, and 53. The electrical circuit is completed between the said supply and the treater electrodes through the interrupter 47, the conductors 51 and 52, and through the lead-in insulator bushings 30 and 31, as hereinbefore described.

The operation is as follows:

The emulsion to be treated enters through inlet pipe 13 and falls upon the topmost plate electrode 25. The emulsion thus introduced onto the top plate surface flows down the slope thereof and being confined by the upwardly extending sides as illustrated at 26 in Figure 3, flows over the curving lip 28 at the lower point thereof and falls to the next succeeding plate surface. Emulsion thus falls from plate to plate throughout the height of the treater in a succession of interrupted streams, each stream extending from the point or lip of one electrode to the surface of the opposite one. The emulsion after having traversed the series of electrodes, falls to the bottom of the treater where it accumulates in a body, as indicated by liquid level line 40, and from which it is withdrawn through outlet 14 and regulator valve 39. The float 35 in float control 36 regulates the level of accumulated emulsion in the treater to a height approximately as shown at line 40 by operating to close the valve 39 by means of rod 38 when the said liquid level lowers, and to open the valve 39 when the liquid level rises.

By impressing a high electric potential difference between the electrode systems within the treater a high potential difference is thereby imposed between the points and surfaces of the interspaced sloping electrode plates between which the emulsion streams fall. In so doing a high electric potential gradient is imposed upon the said streams of emulsion flowing between the said plate electrodes, and treatment of the emulsion is effected at these points. The emulsion stream undergoing treatment falling from electrode to electrode is inherently rapidly moving and highly agitated which is conducive to non-short-circuiting and a condition of maximum treating efficiency.

The high electric potential utilized in treating the emulsion is supplied by means of a high tension step-up transformer 45 which char es a high voltage electrical condenser 46 througn conductors 49 and 50. The condenser 49 is connected to the electrodes in the treater through conductors 51, 52, 53, and interrupter 47 through the lead-in insulator bushings 30 and 31 and flexible connections within the treater 32 and 33. Interrupter 47 is of the well-known type used in connection with high voltage electrical systems and serves to allow condenser 46 to be fully electrically charged while out of circuit with the treater after which it is connected and allowed to suddenly discharge through the treater. Interrupter 47 may be operated to allow any desired number of charges and interruptions to take place, but preferably it is operated in synchronism with the supply current, and thus, intermittent charges can be transmitted to the treater at any frequency which is a whole or fractional multiple of said supply current frequency. Thus, with a 60 cycle supply current the intermittent treater charges may occur 30, 60, or 120 etc., times per second.

An uninterrupted current may be employed at times and is often employed to advantage in this type of treater.

A pressure is maintained in the treater at all times sufficient to prevent excessive evaporation and formation of gases therein, and this pressure may be regulated by means of valve 16 through line 15. In starting the treater it is necessary that it be filled with a non-combustible mixture of gases, and this mixture may be obtained by introduction of suitable gases through the said line 15 and valve 16. The space in the treater above the liquid level 40 is maintained at all times filled with gas so that the electrode systems never at any time come in contact with the treated emulsion liquid body.

The emulsion to be treated is preferably preheated by indirect heat exchange with a heating fluid prior to its introduction into the treater through inlet 13.

The treated emulsion after withdrawal through line 13 and valve 39 may be introduced into a settling tank where it remains quiescent for a sufficient period of time to allow settling and separation of the oil and water.

The voltages supplied by the high voltage transformer may vary from 11,000 to 33,000 volts, the voltage gradient in the emulsion streams undergoing treatment being preferably maintained at a value of about 10,000 per inch.

It is to be understood that the foregoing is merely illustrative of one method and apparatus of operation and that the invention is not limited thereby but may include any method and apparatus within the scope of the disclosure and claims.

I claim:

1. A process for dehydrating petroleum emulsions which comprises supplying emulsion to be treated to the surface of an electrode, allowing the said emulsion to fall freely from said electrode and impinge upon a second electrode, establishing an edge discharge from said first mentioned electrode in the direction of flow of said emulsion and maintaining an intense electric field between said electrodes and subjecting said falling stream of emulsion to the high potential gradient resulting from said electric field.

2. An apparatus for dehydrating emulsions which comprises a plurality of electrodes, means to supply emulsion to be treated to the surface of one of said electrodes and to fall freely from said electrode and impinge upon a second electrode, means to establish an edge discharge from said first mentioned electrode in the direction of flow of said emulsion, and means to maintain an intense electric field between said electrodes whereby emulsion falling from one electrode to another is subjected to the high potential gradient resulting from said electric field.

3. An apparatus for dehydrating emulsions which comprises a tank, a plurality of electrodes within said tank and spaced one above another, said electrodes being provided with downward curved lips, means to deliver emulsion to be treated to the surfaces of said electrodes, and means to maintain an intense electric field between said electrodes whereby emulsion falling from one electrode to another is subjected to the high potential gradient resulting from said electric field.

LYLE DILLON.